(12) United States Patent  
Liu et al.

(10) Patent No.: US 8,422,725 B2
(45) Date of Patent: Apr. 16, 2013

(54) BOBBIN AND LOUDSPEAKER USING THE SAME

(75) Inventors: Liang Liu, Beijing (CN); Jia-Ping Wang, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 352 days.

(21) Appl. No.: 12/824,373

(22) Filed: Jun. 28, 2010

(65) Prior Publication Data

US 2010/0329502 A1 Dec. 30, 2010

(30) Foreign Application Priority Data

Jun. 26, 2009 (CN) .......................... 2009 1 0108180

(51) Int. Cl.
*H04R 1/22* (2006.01)
*H04R 9/02* (2006.01)
*H04R 1/20* (2006.01)
*H04R 9/06* (2006.01)

(52) U.S. Cl.
USPC ........... 381/407; 381/400; 381/409; 381/410; 977/742; 977/949

(58) Field of Classification Search .................. 381/407, 381/400, 401, 403, 405, 409, 410; 977/742, 977/902, 949, 956, 932
See application file for complete search history.

(56) References Cited

U.S. PATENT DOCUMENTS

| | | | |
|---|---|---|---|
| 4,312,118 A | 1/1982 | Saik et al. | |
| 5,903,658 A * | 5/1999 | Okazaki et al. | 381/428 |
| 6,808,746 B1 | 10/2004 | Dai et al. | |
| 7,437,938 B2 | 10/2008 | Chakraborty | |
| 7,864,977 B2 * | 1/2011 | Sadaie et al. | 381/407 |
| 8,021,640 B2 * | 9/2011 | Kim et al. | 423/447.1 |
| 8,058,787 B2 * | 11/2011 | Ra et al. | 313/310 |
| 8,165,336 B2 * | 4/2012 | Iino et al. | 381/407 |
| 8,247,055 B2 * | 8/2012 | Jiang et al. | 428/40.1 |
| 2004/0020681 A1 | 2/2004 | Hjortstam et al. | |
| 2004/0053780 A1 | 3/2004 | Jiang et al. | |
| 2005/0079386 A1 * | 4/2005 | Brown et al. | 428/690 |
| 2005/0178516 A1 * | 8/2005 | Sekikawa et al. | 162/159 |
| 2006/0099419 A1 * | 5/2006 | Kwon et al. | 428/375 |

(Continued)

FOREIGN PATENT DOCUMENTS

| | | |
|---|---|---|
| CN | 2282253 | 5/1998 |
| CN | 1270488 | 10/2000 |

(Continued)

OTHER PUBLICATIONS

Xiao et al.,Flexible, Stretchable, Transparent Carbon Nanotube Thin Film Loudspeakers,Nanoletter, vol. 8; No. 12, 4539-4545, Sep. 2008.

*Primary Examiner* — Edgardo San Martin
(74) *Attorney, Agent, or Firm* — Altis Law Group, Inc.

(57) ABSTRACT

A bobbin for a loudspeaker includes at least one base and at least one carbon nanotube structure. The at least one carbon nanotube structure is positioned on at least one surface of the base. A loudspeaker includes a magnetic circuit, a bobbin; a voice coil, and a diaphragm. The magnetic circuit defines a magnetic gap. The bobbin is located in the magnetic gap and includes at least one carbon nanotube structure. The voice coil is wounded on the bobbin. The diaphragm includes an inner rim fixed to the bobbin.

19 Claims, 8 Drawing Sheets

U.S. PATENT DOCUMENTS

| | | | |
|---|---|---|---|
| 2007/0166223 A1 | 7/2007 | Jiang et al. | |
| 2008/0248235 A1 | 10/2008 | Feng et al. | |
| 2008/0297878 A1* | 12/2008 | Brown et al. | 359/263 |
| 2008/0304694 A1 | 12/2008 | Hayashi | |
| 2009/0045005 A1* | 2/2009 | Byon et al. | 181/167 |
| 2009/0068448 A1 | 3/2009 | Liu et al. | |
| 2009/0074228 A1* | 3/2009 | Mango et al. | 381/432 |
| 2009/0116681 A1* | 5/2009 | Sadaie et al. | 381/401 |
| 2009/0153502 A1 | 6/2009 | Jiang et al. | |
| 2009/0155467 A1 | 6/2009 | Wang et al. | |
| 2009/0160799 A1 | 6/2009 | Jiang et al. | |
| 2009/0197082 A1 | 8/2009 | Jiang et al. | |
| 2009/0220767 A1 | 9/2009 | Schlögl et al. | |
| 2009/0272935 A1 | 11/2009 | Hata et al. | |
| 2010/0224354 A1* | 9/2010 | Dooley et al. | 165/185 |
| 2010/0329501 A1* | 12/2010 | Liu et al. | 381/407 |
| 2010/0329502 A1* | 12/2010 | Liu et al. | 381/407 |
| 2011/0026750 A1* | 2/2011 | Wang et al. | 381/335 |
| 2011/0038504 A1* | 2/2011 | Liu et al. | 381/392 |
| 2011/0051984 A1* | 3/2011 | Liu et al. | 381/394 |
| 2011/0064259 A1* | 3/2011 | Liu et al. | 381/398 |
| 2011/0069860 A1* | 3/2011 | Liu et al. | 381/413 |
| 2011/0075878 A1* | 3/2011 | Liu et al. | 381/394 |
| 2011/0116677 A1* | 5/2011 | Wang et al. | 381/400 |
| 2011/0139361 A1* | 6/2011 | Liu et al. | 156/249 |

FOREIGN PATENT DOCUMENTS

| | | |
|---|---|---|
| CN | 2488247 | 4/2002 |
| CN | 1430785 | 7/2003 |
| CN | 2583909 | 10/2003 |
| CN | 1640923 | 7/2005 |
| CN | 1982209 A | 6/2007 |
| CN | 101239712 | 8/2008 |
| CN | 101288336 | 10/2008 |
| CN | 101288336 A | 10/2008 |
| CN | 101304945 | 11/2008 |
| CN | 101321410 | 12/2008 |
| CN | 101381071 | 3/2009 |
| CN | 101464759 | 6/2009 |
| CN | 101497435 A | 8/2009 |
| CN | 101499328 | 8/2009 |
| JP | 60-27298 | 2/1985 |
| JP | 63-49991 | 12/1988 |
| JP | 7-138838 | 5/1995 |
| JP | 2002-171593 | 6/2002 |
| JP | 2002-542136 | 12/2002 |
| JP | 2003-319490 | 11/2003 |
| JP | 2004-32425 | 1/2004 |
| JP | 2004-107196 | 4/2004 |
| JP | 2006-147801 | 6/2006 |
| JP | 2007-182352 | 7/2007 |
| JP | 2007-290908 | 11/2007 |
| JP | 2009-144158 | 7/2009 |
| JP | 2009-146420 | 7/2009 |
| JP | 2009-184910 | 8/2009 |

* cited by examiner

BOBBIN AND LOUDSPEAKER USING THE SAME

RELATED APPLICATIONS

This application claims all benefits accruing under 35 U.S.C. §119 from China Patent Application No. 200910108180.4, filed on Jun. 26, 2009, in the China Intellectual Property Office, the contents of which are hereby incorporated by reference. This application is related to commonly-assigned application entitled, "BOBBIN AND LOUDSPEAKER USING THE SAME", filed Jun. 28, 2010 12/824,371.

BACKGROUND

1. Technical Field

The present disclosure relates to bobbins and speakers adopting the same.

2. Description of Related Art

A loudspeaker is an acoustic device transforming received electric signals into sounds. An electro-dynamic loudspeaker typically includes a diaphragm, a bobbin, a voice coil, a damper, a magnet, and a frame. The voice coil is an electrical conductor wrapped around the bobbin. The bobbin is connected to the diaphragm. The voice coil is placed in the magnetic field of the magnet.

To evaluate the loudspeaker, sound volume is a decisive factor. The sound volume of the loudspeaker relates to the input power of the electric signals and the conversion efficiency of the energy (e.g., the conversion efficiency of the electrical to sound). The larger the input power, the larger the conversion efficiency of the energy, the bigger the sound volume of the loudspeaker. However, when the input power is increased to certain levels, the bobbin and diaphragm could deform or even break, thereby causing audible distortion. Therefore, the strength and tensile modulus of the elements in the loudspeaker are decisive factors of a rated power of the loudspeaker. The rated power is the highest input power by which the loudspeaker can produce sound without the audible distortion. Additionally, the lighter the weight of the elements in the loudspeaker, such as the weight of the bobbin and the weight per unit area of the diaphragm, the smaller the energy required for making the diaphragm vibrate, the higher the energy conversion efficiency of the loudspeaker, and the higher the sound volume produced by the same input power. Thus, the strength and the weight of the bobbin are important factors affecting the sound volume of the loudspeaker. The weight of the bobbin is related to a thickness and a density thereof. Accordingly, the higher the specific strength (e.g., strength-to-density ratio), the smaller the thickness of the bobbin of the loudspeaker, and the higher the sound volume of the loudspeaker.

However, the typical bobbin is usually made of paper, cloth, polymer, or composite material. The rated power of the conventional loudspeakers is difficult to increase partly due to the restriction of the conventional material of the bobbin. In general, the rated power of a small sized loudspeaker is only 0.3 watt (W) to 0.5 W. A thicker bobbin has a larger specific strength, but increases the weight of the bobbin. Thus, it is difficult to improve the energy conversion efficiency of the loudspeaker. To increase the rated power, the energy conversion efficiency of the loudspeaker, and sound volume, the focus is on increasing the specific strength and decreasing the weight of the bobbin.

What is needed, therefore, is to provide a bobbin with high specific strength and light weight and a loudspeaker using the same.

BRIEF DESCRIPTION OF THE DRAWINGS

Many aspects of the present bobbin and loudspeaker using the same can be better understood with reference to the following drawings. The components in the drawings are not necessarily to scale, the emphasis instead being placed upon clearly illustrating the principles of the present bobbin and a loudspeaker using the same. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Reference will now be made to the drawings to describe, in detail, embodiments of a bobbin and a loudspeaker using the same.

Figure 1:
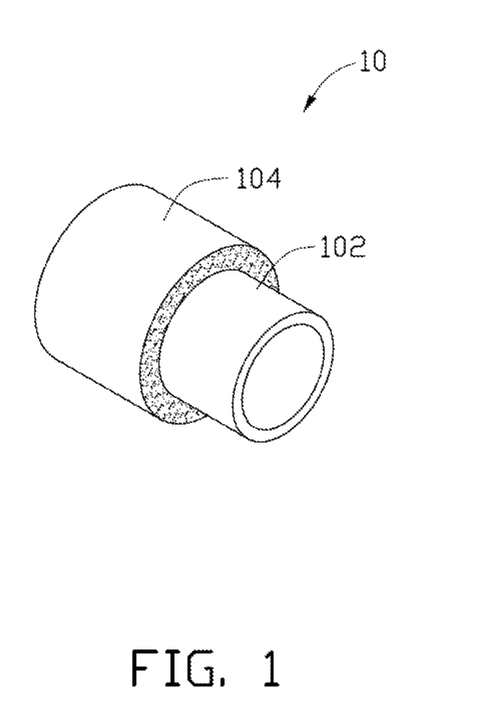
FIG. 1 is a schematic structural view of a first embodiment of a bobbin.

A first embodiment of a bobbin 10 is illustrated in FIG. 1. The bobbin 10 has a hollow tubular structure. The bobbin 10 includes a base 102 and a carbon nanotube structure 104. The carbon nanotube structure 104 is deposited on at least one surface of the base 102. In one embodiment, the base 102 has a cylindrical configuration, and the carbon nanotube structure 104 wraps around an outer circumferential surface of the base 102. In another embodiment, the carbon nanotube structure 104 is disposed on an inner circumferential surface of the base 102.

The base 102 can be made of polyimide, polyester, aluminum, fiberglass, or paper. The base 102 can have a light weight and high specific strength. In one embodiment, the base 102 is a polyimide film. The polyimide film has a small density of about 1.35 g/cm$^3$, thus, it is conducive to decrease the weight of the bobbin 10, and increase the specific strength thereof.

The carbon nanotube structure 104 can include at least one carbon nanotube film. The at least one carbon nanotube film can be directly deposited on or wrapped on the at least one surface of the base 102 to form the bobbin 10. Specifically, the carbon nanotube structure 104 can include a carbon nanotube film or a plurality of carbon nanotube films stacked with each other. The carbon nanotube film can be a freestanding film. The term "freestanding film" includes, but is not limited to, a film that does not have to be supported by a substrate. For example, the freestanding film can sustain the weight of itself when a portion thereof is hoisted without any significant damage to its structural integrity. The carbon nanotube film includes a plurality of carbon nanotubes distributed uniformly and attracted by van der Waals attractive force therebetween. The carbon nanotubes in the carbon nanotube film can be orderly or disorderly aligned. The disorderly aligned carbon nanotubes are arranged along many different directions, such that the number of carbon nanotubes arranged along each different direction can be almost the same (e.g. uniformly disordered); and/or entangled with each other. The orderly aligned carbon nanotubes are arranged in a consistently systematic manner, e.g., most of the carbon nanotubes are arranged approximately along a same direction or have two or more sections within each of which the most of the carbon nanotubes are arranged approximately along a same direction (different sections can have different directions). The carbon nanotubes in the carbon nanotube film can be single-walled, double-walled, and/or multi-walled carbon nanotubes. The diameters of the single-walled carbon nanotubes can range from about 0.5 nanometers to about 50 nanometers. The diameters of the double-walled carbon nanotubes can range from about 1 nanometer to about 50 nanometers. The diameters of the multi-walled carbon nanotubes can range from about 1.5 nanometers to about 50 nanometers. Specifically, the carbon nanotube film can be a drawn carbon nanotube film, a flocculated carbon nanotube film, or a pressed carbon nanotube film. A mass ratio of the carbon nanotube structure 104 in the bobbin 10 can be larger than about 0.1%. In one embodiment, the mass ratio of the carbon nanotube structure 104 in the bobbin 10 can be larger than about 10%.

Figure 2:
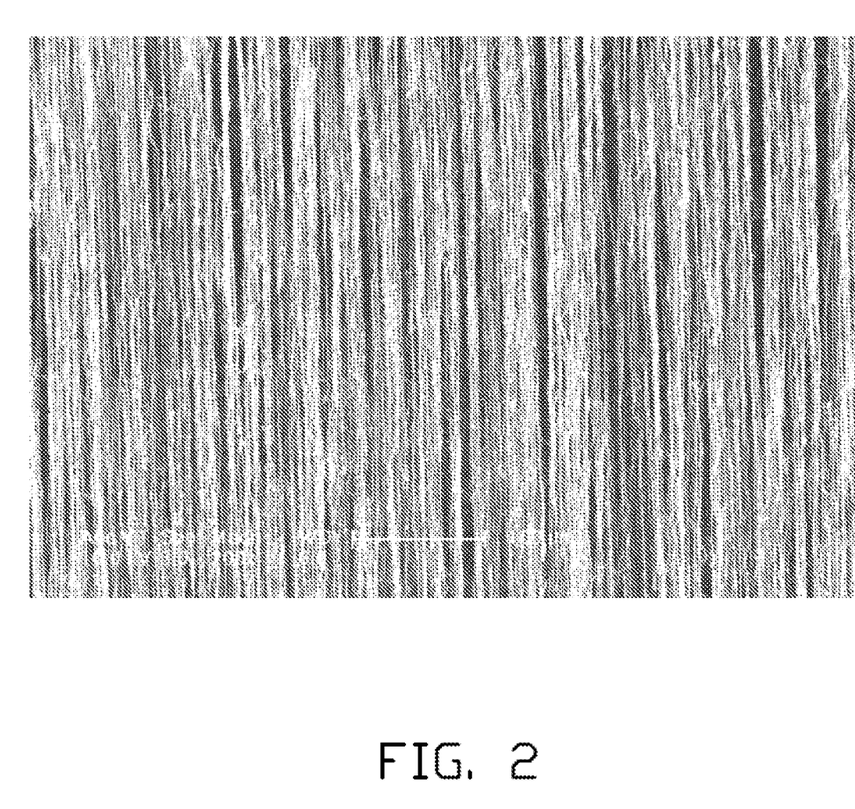
FIG. 2 shows a Scanning Electron Microscope (SEM) image of a drawn carbon nanotube film.

A film can be drawn from a carbon nanotube array, to obtain the drawn carbon nanotube film. Examples of the drawn carbon nanotube film are taught by U.S. Pat. No. 7,045,108 to Jiang et al., and WO 2007015710 to Zhang et al. The drawn carbon nanotube film includes a plurality of carbon nanotubes arranged substantially parallel to a surface of the drawn carbon nanotube film. A large number of the carbon nanotubes in the drawn carbon nanotube film can be oriented along a preferred orientation, meaning that a large number of the carbon nanotubes in the drawn carbon nanotube film are arranged substantially along the same direction. An end of one carbon nanotube is joined to another end of an adjacent carbon nanotube arranged substantially along the same direction, by van der Waals attractive force. The drawn carbon nanotube film is capable of forming a freestanding structure. The term "freestanding structure" includes, but is not limited to, a structure that does not have to be supported by a substrate. For example, the freestanding structure can sustain the weight of itself when a portion thereof is hoisted without any significant damage to its structural integrity. The successive carbon nanotubes joined end to end by van der Waals attractive force realizes the freestanding structure of the drawn carbon nanotube film. A SEM image of the drawn carbon nanotube film is shown in FIG. 2.

Some variations can occur in the orientation of the carbon nanotubes in the drawn carbon nanotube film. Microscopically, the carbon nanotubes oriented substantially along the same direction may not be perfectly aligned in a straight line, and some curve portions may exist. It is understood that a contact between some carbon nanotubes located substantially side by side and oriented along the same direction can not be totally excluded.

More specifically, the drawn carbon nanotube film can include a plurality of successively oriented carbon nanotube segments joined end-to-end by van der Waals attractive force therebetween. Each carbon nanotube segment includes a plurality of carbon nanotubes substantially parallel to each other, and joined by van der Waals attractive force therebetween. The carbon nanotube segments can vary in width, thickness, uniformity, and shape. The carbon nanotubes in the drawn carbon nanotube film are also substantially oriented along a preferred orientation. A thickness of the drawn carbon nanotube film can range from about 0.5 nm to about 100 µm. A width of the drawn carbon nanotube film relates to the carbon nanotube array from which the carbon nanotube film is drawn. If the carbon nanotube structure 104 includes the drawn carbon nanotube film and a thickness of the carbon nanotube structure 104 is relatively small (e.g., smaller than 10 µm), the carbon nanotube structure 104 can have a good transparency, and the transmittance of the light can reach to about 90%. The transparent carbon nanotube structure 104 can be used to make a transparent bobbin 10 with the transparent base 102.

The carbon nanotube structure 104 can include at least two stacked drawn carbon nanotube films. An angle between the aligned directions of the carbon nanotubes in two adjacent carbon nanotube films can range from about 0 degrees to about 90 degrees) ($0°\leq\alpha\leq 90°$). Spaces are defined between two adjacent and side-by-side carbon nanotubes in the drawn carbon nanotube film. If the angle between the aligned directions of the carbon nanotubes in adjacent carbon nanotube films is larger than 0 degrees, the carbon nanotubes define a microporous structure. The carbon nanotube structure 104 employing these films, define a plurality of micropores. A diameter of the micropores can be smaller than about 10 µm. Stacking the carbon nanotube films will add to the structural integrity of the carbon nanotube structure 104.

The flocculated carbon nanotube film can include a plurality of long, curved, disordered carbon nanotubes entangled with each other. A length of the carbon nanotubes can be larger than about 10 µm. In one embodiment, the length of the carbon nanotubes is in a range from about 200 µm to about 900 µm. Further, the flocculated carbon nanotube film can be isotropic. Adjacent carbon nanotubes are acted upon by van der Waals attractive force to obtain an entangled structure with micropores defined therein. The flocculated carbon nanotube film is very porous. The sizes of the micropores can be less than 10 µm. In one embodiment, the sizes of the micropores are in a range from about 1 nm to about 10 µm. Further, because the carbon nanotubes in the carbon nanotube structure 104 are entangled with each other, the carbon nanotube structure 104 employing the flocculated carbon nanotube film has excellent durability and can be fashioned into desired shapes with a low risk to the integrity of the carbon nanotube structure 104. The flocculated carbon nanotube film is freestanding because the carbon nanotubes are entangled and adhere together by van der Waals attractive force therebetween. The thickness of the flocculated carbon nanotube film can range from about 1 µm to about 1 mm. In one embodiment, the thickness of the flocculated carbon nanotube film is about 100 µm.

The pressed carbon nanotube film can be a freestanding carbon nanotube film formed by pressing a carbon nanotube array on a substrate. The carbon nanotubes in the pressed carbon nanotube film are substantially arranged along a same direction or along different directions. The carbon nanotubes in the pressed carbon nanotube film can rest upon each other. Adjacent carbon nanotubes are attracted to each other and are combined by van der Waals attractive force. An angle between a primary alignment direction of the carbon nanotubes and a surface of the pressed carbon nanotube film is about 0 degrees to about 15 degrees. The greater the pressure applied, the smaller the angle obtained. If the carbon nanotubes in the pressed carbon nanotube film are arranged along different directions, the carbon nanotube structure 104 can be isotropic.

Here, "isotropic" means the carbon nanotube film has properties identical in all directions substantially parallel to a surface of the carbon nanotube film. A thickness of the pressed carbon nanotube film ranges from about 0.5 nm to about 1 mm. A length of the carbon nanotubes can be larger than 50 μm. Clearances can exist in the carbon nanotube array. Therefore, micropores can exist in the pressed carbon nanotube film defined by the adjacent carbon nanotubes. An example of a pressed carbon nanotube film is taught by US PGPub. 20080299031A1 to Liu et al.

An adhesive or a hot-pressing method to form a multi-layer structure may combine the base 102 and the carbon nanotube structure 104. The adhesive can be selected according to the material of the base 102, such as when the material of the base 102 is metal, the adhesive can be a silver glue. When the base 102 and the carbon nanotube structure 104 is combined by the adhesive, an adhesive layer (not shown) can be formed by the adhesive between the base 102 and the carbon nanotube structure 104. The material of the adhesive layer can be metal, paper, polymer, diamond, boron carbide, ceramics and other materials. The adhesive layer can be formed on the surface of the carbon nanotube structure 104 by a coating method or a depositing method. The material of the adhesive layer can be combined with the base 102 firmly or have good compatibility with the base 102. For example, if the material of the base 102 is metal, the material of the adhesive layer can comprise the same metal as that of the base 102 to make the carbon nanotube structure 104 firmly combine with the base 102. It is noteworthy that the carbon nanotubes can partly penetrate into the base 102 at contact portions between the carbon nanotube structure 104 and the base 102, resulting in a firmer combination therebetween.

If the base 102 and the carbon nanotube structure 104 are combined by the hot-pressing method, the base 102 and the carbon nanotube structure 104 can be placed in a hot-pressing machine and pressed at a predetermined temperature, e.g., a temperature at about the melting temperature of the base 102. In one embodiment, the base 102 and the carbon nanotube structure 104 can be combined by the adhesive and then hot pressed by the hot pressing method to acquire a stronger adhesion.

It is noteworthy that methods for making the bobbin 10 are not limited. The bobbin 10 can be made by the following two methods. The first method can include the following steps of:

supplying a column having a surface;
preparing a multi-layer structure formed by the base 102 and the carbon nanotube structure 104, the carbon nanotube structure 104 and the base 102 being combined firmly, such as by an adhesive or a hot pressing method; and
wrapping the multi-layer structure on the surface of the column.

The second method can include the following steps of:
supplying a column having a surface;
directly wrapping the carbon nanotube structure 104 and the base 102 on the surface of the column in sequence; and
combining the carbon nanotube structure 104 and the base 102 firmly, such as by an adhesive or a hot pressing method.

Figure 3:
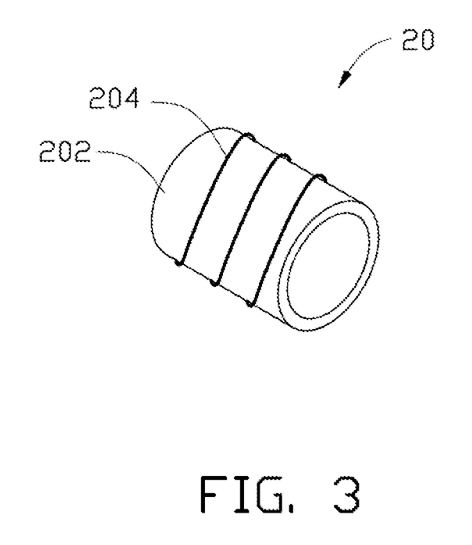
FIG. 3 is a schematic structural view of a second embodiment of a bobbin.

The bobbin 10 adopting the carbon nanotube structure 104 can have a high specific strength and a lower weight because the carbon nanotube structure 104 has excellent mechanical strength and is lightweight. The increase of the specific strength can include increasing the strength of the bobbin while the density thereof is decreased, increasing the strength of the bobbin while the density thereof is increased, and decreasing the strength of the bobbin while the density thereof is decreased. A second embodiment of a bobbin 20 is illustrated in FIG. 3. The bobbin 20 has a hollow tubular structure. The bobbin 20 includes a base 202 and a carbon nanotube structure 204. The carbon nanotube structure 204 is deposited on an outer circumferential surface of the base 202. The carbon nanotube structure 204 includes a carbon nanotube wire structure.

The compositions, features, and functions of the bobbin 20 in the embodiment shown in FIG. 3, are similar to the bobbin 10 in the first embodiment shown in FIG. 1, except that the present carbon nanotube structure 204 includes a carbon nanotube wire structure. The carbon nanotube wire structure can wrap around the surface of the base 202. Specifically, the carbon nanotube wire structure can be wrapped around the surface of the base like a helix. A diameter of the carbon nanotube wire structure can be in a range from about 0.5 nm to about 1 mm.

The carbon nanotube wire structure includes at least one carbon nanotube wire. If the carbon nanotube wire structure includes a plurality of carbon nanotube wires, the carbon nanotube wires can be substantially parallel to each other to form a bundle-like structure or twisted with each other to form a twisted structure. The bundle-like structure and the twisted structure are two kinds of linear shaped carbon nanotube structure.

The carbon nanotube wire can be untwisted or twisted. Treating the drawn carbon nanotube film with a volatile organic solvent can obtain the untwisted carbon nanotube wire. In one embodiment, the organic solvent is applied to soak the entire surface of the drawn carbon nanotube film. During soaking, adjacent parallel carbon nanotubes in the drawn carbon nanotube film will bundle together, due to the surface tension of the organic solvent as it volatilizes, and thus, the drawn carbon nanotube film will be shrunk into an untwisted carbon nanotube wire. The untwisted carbon nanotube wire includes a plurality of carbon nanotubes substantially oriented along a same direction (i.e., a direction along the length direction of the untwisted carbon nanotube wire). The carbon nanotubes are substantially parallel to the axis of the untwisted carbon nanotube wire. In one embodiment, the untwisted carbon nanotube wire includes a plurality of successive carbon nanotubes joined end to end by van der Waals attractive force therebetween. The length of the untwisted carbon nanotube wire can be arbitrarily set as desired. A diameter of the untwisted carbon nanotube wire can range from about 0.5 nm to about 100 μm. An example of the untwisted carbon nanotube wire is taught by US Patent Application Publication US 2007/0166223 to Jiang et al.

The twisted carbon nanotube wire can be obtained by twisting a drawn carbon nanotube film using a mechanical force to turn the two ends of the drawn carbon nanotube film in opposite directions. The twisted carbon nanotube wire includes a plurality of carbon nanotubes helically oriented around an axial direction of the twisted carbon nanotube wire. In one embodiment, the twisted carbon nanotube wire includes a plurality of successive carbon nanotubes joined end to end by van der Waals attractive force therebetween. The length of the carbon nanotube wire can be set as desired. A diameter of the twisted carbon nanotube wire can be from about 0.5 nm to about 100 μm.

The carbon nanotube wire is a freestanding structure. The carbon nanotube wire has a large strength and tensile modulus. Therefore, by arranging the carbon nanotube wire to set the carbon nanotube wire wrapped around a base 202, the strength and tensile modulus of the bobbin 20 can be improved.

It is noteworthy that the carbon nanotube wire structure 204 can also include a carbon nanotube hybrid wire structure (not shown). The carbon nanotube hybrid wire structure can include a bundle-like structure formed by at least one carbon nanotube wire and at least one base wire substantially parallel to each other, or a twisted structure formed by at least one carbon nanotube wire and at least one base wire twisted with each other. A material of the base wire can be the same as that of the base 202. The base wire can have an excellent specific strength and a low density. Further, the base wire can also have a good high temperature resistance property. In one embodiment, the base wire can be resistant to a temperature larger than about 250° C.

Figure 4:
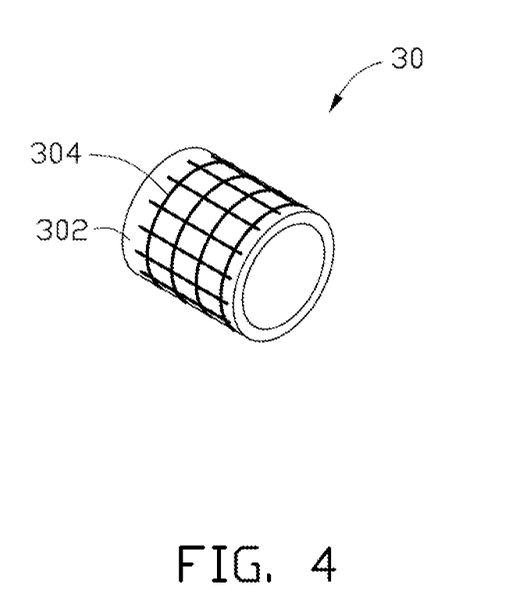
FIG. 4 is a schematic structural view of a third embodiment of a bobbin.

A third embodiment of a bobbin 30 is illustrated in FIG. 4. The bobbin 30 has a hollow tubular structure. The bobbin 30 includes a base 302 and a carbon nanotube structure 304 deposited on at least one surface of the base 302. Specifically, the carbon nanotube structure 304 is located directly on at least one surface of the base 302. The carbon nanotube structure 304 includes a plurality of carbon nanotube wire structures.

The compositions, features, and functions of the bobbin 30 in the third embodiment shown in FIG. 4 are similar to the bobbin 20 in the second embodiment shown in FIG. 3, except that the present carbon nanotube structure 304 includes a plurality of carbon nanotube wire structures. The plurality of carbon nanotube wire structures can be substantially parallel to each other, crossed with each other, or woven together, and positioned on at least one surface of the base 302. Specifically, the plurality of carbon nanotube wire structures can be substantially parallel to each other, crossed with each other or woven together to form a planar shaped structure, and then the planar shaped structure can be wrapped around the surface of the base 302 by an adhesive or a hot pressing method. The plurality of carbon nanotube wire structures also can be directly positioned on at least one surface of the base 302 substantially parallel to each other, crossed with each other, or woven together by an adhesive or a hot pressing method.

The plurality of carbon nanotube wire structures can also be woven together with at least one base wire of the second embodiment. The plurality of carbon nanotube wire structures and the at least one base wire, which can be substantially parallel to each other, crossed with each other or woven together, are placed on the surface of the base 302 by an adhesive or a hot pressing method.

Figure 5:
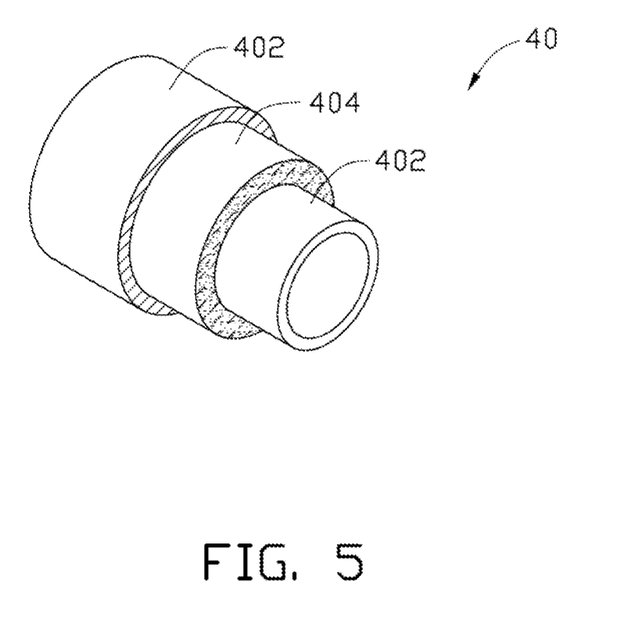
FIG. 5 is a schematic structural view of a fourth embodiment of a bobbin.

A fourth embodiment of a bobbin 40 is illustrated in FIG. 5. The bobbin 40 has a hollow tubular structure and has a three or more-layer structure (e.g., the layers of the bobbin 40 are larger than or equal to three). Specifically, the bobbin 40 can include a base 402 of two or more layers and at least one layer of a carbon nanotube structure 404, or include two or more layers of the carbon nanotube structure 404 and a base 402 of at least one layer. The carbon nanotube structure 404 and the base 402 can be alternately arranged. The base 402 also has a hollow tubular structure.

The compositions, features, and functions of the bobbin 40 in the fourth embodiment shown in FIG. 5 are similar to the bobbin 10 in the first embodiment shown in FIG. 1, except that the present bobbin 40 has a three or more-layer structure. The carbon nanotube structure 404 and the base 402 are alternately arranged and are stacked with each other. It is noteworthy that the carbon nanotube structure 404 can be the carbon nanotube structure 104 shown in FIG. 1, the carbon nanotube structure 204 shown in FIG. 3, the carbon nanotube structure 304 shown in FIG. 4, or any combination thereof. If the carbon nanotube structure 404 includes at least one carbon nanotube film and at least one carbon nanotube wire structure, the at least one carbon nanotube wire structure can be positioned on a surface of the at least one carbon nanotube film firmly by an adhesive or a hot pressing method. The method for making the bobbin 40 is similar to that for making the first embodiment of the bobbin 10. In one embodiment, the bobbin 40 includes a carbon nanotube structure 104 positioned between two layers of the base 402, that is, the base 402, the carbon nanotube structure 104 and the base 402 are arranged in sequence.

Figure 6:
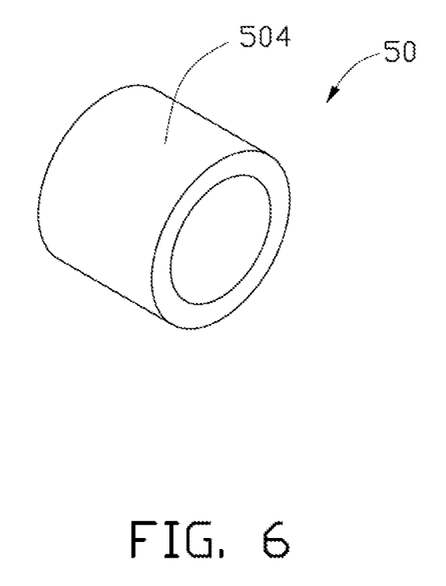
FIG. 6 is a schematic structural view of a fifth embodiment of a bobbin.

The compositions, features, and functions of the bobbin 50 in the fifth embodiment shown in FIG. 6 are similar to the bobbin 10 in the embodiment shown in FIG. 1, except that the present bobbin 50 comprises a carbon nanotube structure 504. The carbon nanotube structure 504 has a freestanding structure. The carbon nanotube structure 504 can include at least one carbon nanotube film, at least one carbon nanotube wire structure or a combination thereof.

A method for making the bobbin 50 includes the steps of wrapping the freestanding carbon nanotube structure 504 around a column and removing the column to form the bobbin 50. A heat treating process of the carbon nanotube structure 504 can be further provided after wrapping the freestanding carbon nanotube structure 504 around a column to help keep the shape of the carbon nanotube structure 504. Because the carbon nanotube structure 504 can resist a high temperature of about 600° C., the bobbin 50, comprising the carbon nanotube structure 504 has good heat resistance properties.

If the carbon nanotube structure 504 includes a carbon nanotube wire structure, the carbon nanotube wire structure can also be woven with a base wire as illustrated in the second embodiment to form the bobbin 50. If the carbon nanotube structure 504 includes a plurality of carbon nanotube wire structures, the carbon nanotube wire structures and the base wires can be substantially parallel to each other, crossed with each other, or woven together.

Figure 7:
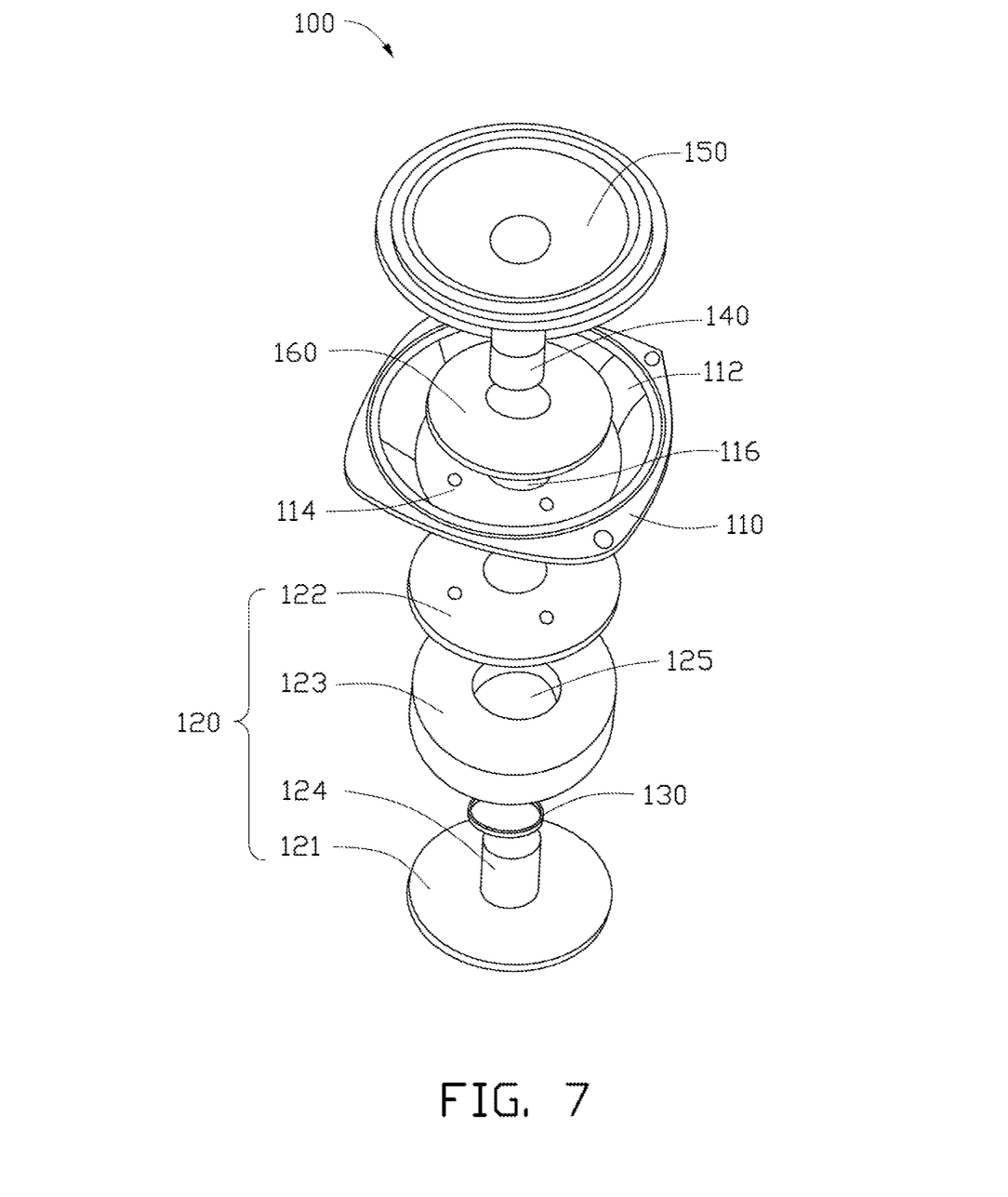
FIG. 7 is a schematic structural view of one embodiment of a loudspeaker using the bobbin.
Figure 8:
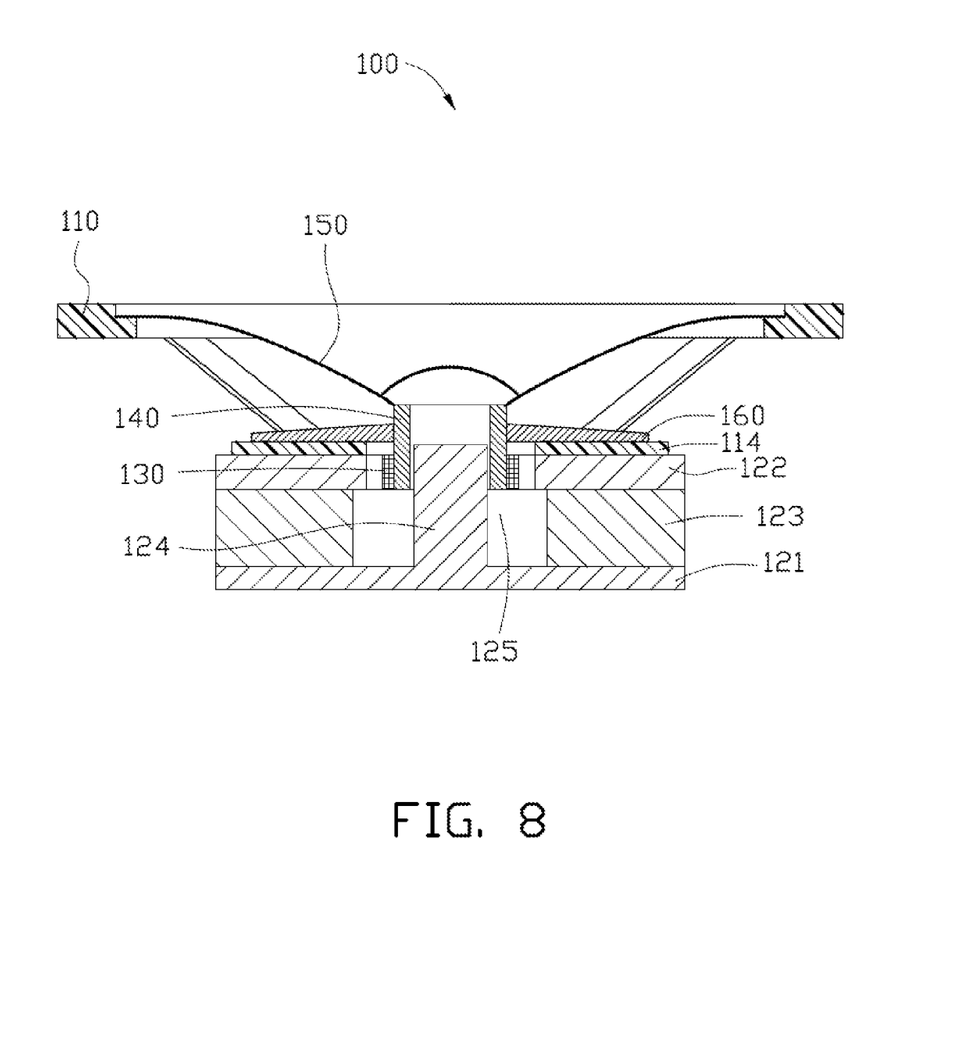
FIG. 8 is a cross-sectional view of one embodiment of the loudspeaker of FIG. 7.

One embodiment of a loudspeaker 100 using a bobbin 140 is illustrated in FIGS. 7 and 8. The bobbin 140 can be any of the aforementioned bobbins 10, 20, 30, 40, 50. The loudspeaker 100 includes a frame 110, a magnetic system 120, a voice coil 130, the bobbin 140, a diaphragm 150, and a damper 160.

The frame 110 is mounted on an upper side of the magnetic system 120. The voice coil 130 is received in the magnetic system 120. The voice coil 130 is wound up on the bobbin 140. An outer rim of the diaphragm 150 is fixed to an inner rim of the frame 110, and an inner rim of the diaphragm 150 is fixed to an outer rim of the bobbin 140 placed in a magnetic gap 125 of the magnetic system 120.

The frame 110 is a truncated cone with an opening on one end and includes a hollow cavity 112 and a bottom 114. The hollow cavity 112 receives the diaphragm 150 and the damper 160. The bottom 114 has a center hole 116 to accommodate the center pole 116 of the magnetic system 120. The bottom 114 of the frame 110 is fixed to the magnetic system 120.

The magnetic system 120 includes a lower plate 121 having a center pole 124, an upper plate 122, and a magnet 123. The magnet 123 is sandwiched by the lower plate 121 and the upper plate 122. The upper plate 122 and the magnet 123 are both circular, and define a cylinder shaped space in the magnet circuit 120. The center pole 124 is accepted in the cylinder shaped space and goes through the center pole 124. The magnetic gap 125 is formed by the center pole 124 and the magnet 123. The magnetic system 120 is fixed on the bottom 114 at the upper plate 122.

The voice coil 130 wound on the bobbin 140 is a driving member of the loudspeaker 100. The voice coil 130 is made of conducting wire. When the electric signal is input into the voice coil 130, a magnetic field can be formed by the voice coil 130 as the variation of the electric signal. The interaction of the magnetic field caused by the voice coil 130 and the magnetic system 120 produce the vibration of the voice coil 130.

The bobbin 140 is light in weight and has a hollow structure. The bobbin 140 can be the bobbin 10 shown in FIG. 1, or the bobbin 20 shown in FIG. 3, the bobbin 30 shown in FIG. 4, the bobbin 40 shown in FIG. 5, or the bobbin 50 shown in FIG. 6. The center pole 124 is positioned in the hollow structure and is spaced from the bobbin 140. When the voice coil 130 vibrates, the bobbin 140 and the diaphragm 150 also vibrate with the voice coil 130 to produce sound.

The diaphragm 150 is a sound producing member of the loudspeaker 40. The diaphragm 150 can have a cone shape when used in a large sized loudspeaker 40. If the loudspeaker 100 is a smaller size, the diaphragm 150 can have a planar round shape or a planar rectangle shape.

The damper 160 is substantially ring-shaped plate having radially alternating circular ridges and circular furrows. The damper 160 holds the diaphragm 150 mechanically. The damper 160 is fixed to the frame 110 and the bobbin 140. The damper 160 has a relatively large rigidity along the radial direction thereof, and a relatively small rigidity along the axial direction thereof, such that the voice coil can freely move up and down but not radially.

Furthermore, an external input terminal can be attached to the frame 110. A dust cap can be fixed over and above a joint portion of the diaphragm 150 and the bobbin 140.

Finally, it is to be understood that the above-described embodiments are intended to illustrate rather than limit the disclosure. Variations may be made to the embodiments without departing from the spirit of the disclosure as claimed. Elements associated with any of the above embodiments are envisioned to be associated with any other embodiments. The above-described embodiments illustrate the scope of the disclosure but do not restrict the scope of the disclosure.

What is claimed is:

1. A bobbin, comprising
   at least one base having at least one surface; and
   at least one carbon nanotube structure positioned on the at least one surface of the at least one base, wherein the at least one carbon nanotube structure comprises a plurality of carbon nanotubes attracted by van der Waals attractive force therebetween.

2. The bobbin of claim 1, wherein the at least one base has a hollow tubular structure, and the at least one carbon nanotube structure is wrapped around an outer circumferential surface of the at least one base.

3. The bobbin of claim 1, wherein the at least one base comprises a plurality of bases and the at least one carbon nanotube structure comprises a plurality of carbon nanotube structures, the plurality of bases and the plurality of carbon nanotube structures being alternately arranged.

4. The bobbin of claim 1, wherein the at least one base and the at least one carbon nanotube structure are combined firmly by an adhesive.

5. The bobbin of claim 1, wherein the at least one base and the at least one carbon nanotube structure are combined firmly by a hot pressing method.

6. The bobbin of claim 1, wherein the at least one carbon nanotube structure comprises at least one carbon nanotube film, at least one carbon nanotube wire structure, or a combination of the at least one carbon nanotube film and the at least one carbon nanotube wire structure.

7. The bobbin of claim 6, wherein the at least one carbon nanotube film comprises a plurality of carbon nanotubes distributed uniformly therein.

8. The bobbin of claim 6, wherein the at least one carbon nanotube structure comprises two or more stacked carbon nanotube films.

9. The bobbin of claim 6, wherein the at least one carbon nanotube film comprises a plurality of carbon nanotubes substantially parallel to a surface of the at least one carbon nanotube film, the plurality of the carbon nanotubes are joined end-to-end by van der Waals attractive force therebetween and substantially aligned along a same direction.

10. The bobbin of claim 6, wherein the at least one carbon nanotube structure comprises a plurality of carbon nanotube wire structures substantially parallel to each other, crossed with each other, or woven together.

11. The bobbin of claim 6, wherein the at least one carbon nanotube wire structure comprises at least one twisted carbon nanotube wire, at least one untwisted carbon nanotube wire, or a combination of the at least one twisted carbon nanotube wire and the at least one untwisted carbon nanotube wire.

12. The bobbin of claim 11, wherein the at least one carbon nanotube wire structure comprises a plurality of carbon nanotube wires substantially parallel to each other to form a bundle-like structure or twisted with each other to form a twisted structure.

13. The bobbin of claim 1, wherein a material of the at least one base is selected from the group consisting of polymers, paper, metal and cloth.

14. The bobbin of claim 1, wherein a mass ratio of the at least one carbon nanotube structure is larger than about 0.1%.

15. The bobbin of claim 1, wherein the bobbin comprises a hollow tubular structure formed by at least one base wire and at least one carbon nanotube structure woven together.

16. The bobbin of claim 15, wherein the at least one carbon nanotube structure comprises a plurality of carbon nanotube wire structures and a plurality of base wires crossed with each other.

17. A bobbin, comprising a hollow tubular structure wrapped by a carbon nanotube structure, wherein the carbon nanotube structure comprises a plurality of carbon nanotubes combined by van der Waals attractive force therebetween to form the carbon nanotube structure.

18. A loudspeaker, comprising:
   a magnetic circuit defining a magnetic gap;
   a bobbin located in the magnetic gap and comprising at least one carbon nanotube structure,
   wherein the at least one carbon nanotube structure comprises a plurality of carbon nanotubes attracted by van der Waals attractive force therebetween;
   a voice coil wounded on the bobbin; and
   a diaphragm comprising an inner rim fixed to the bobbin.

19. The bobbin of claim 18, wherein the bobbin further comprises at least one base, the carbon nanotube structure being positioned on at least one surface of the at least one base.

* * * * *